July 19, 1966  A. C. HART  3,261,160
REVOLVING MACHINE
Filed Sept. 1, 1964  2 Sheets-Sheet 1
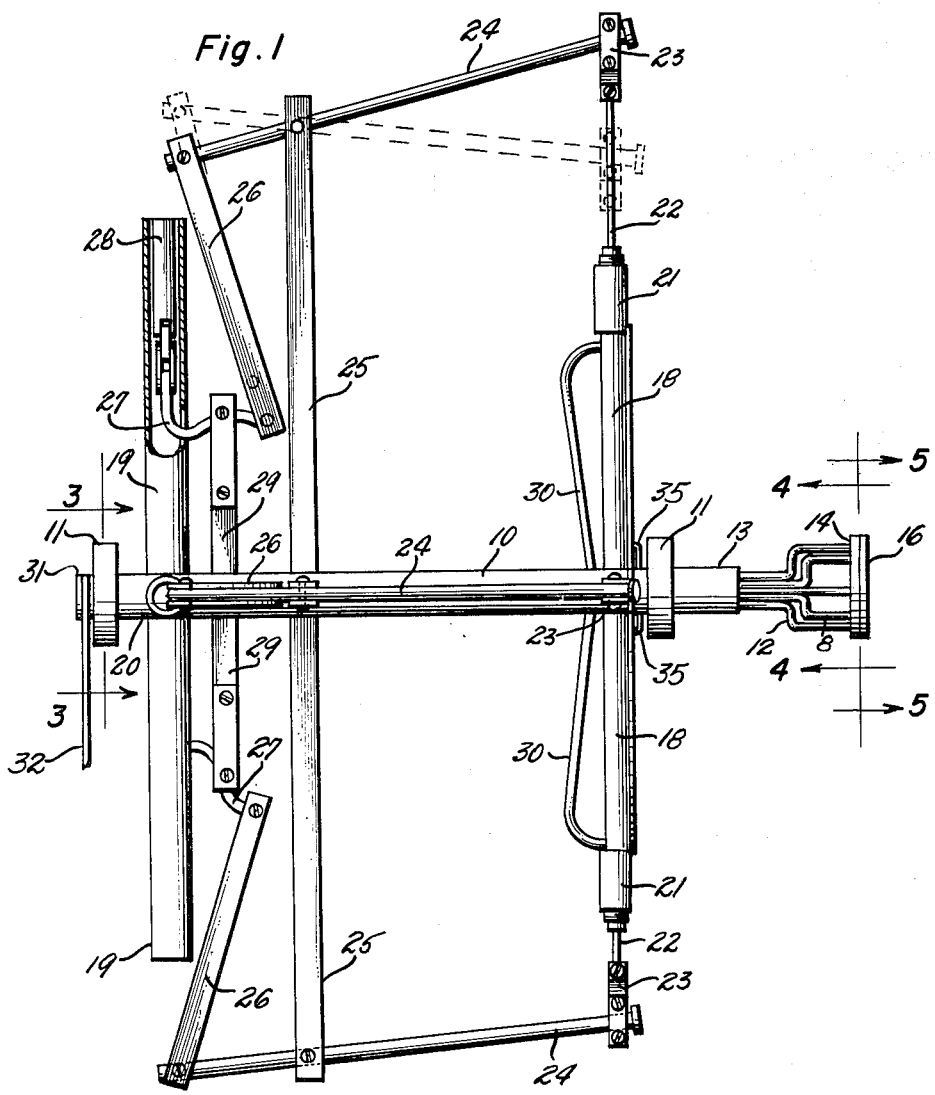
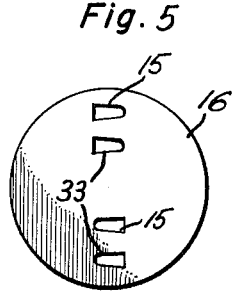
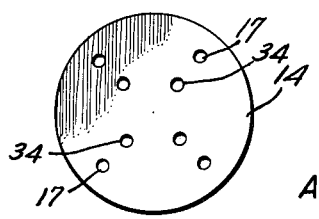
INVENTOR
Area C. Hart July 19, 1966  A. C. HART  3,261,160
REVOLVING MACHINE Filed Sept. 1, 1964  2 Sheets-Sheet 2

*INVENTOR*
*Area C. Hart*

United States Patent Office 3,261,160
Patented July 19, 1966

3,261,160
REVOLVING MACHINE
Area C. Hart, Rte. 3, Westminster, S.C.
Filed Sept. 1, 1964, Ser. No. 393,675
5 Claims. (Cl. 60—10)

This invention relates to machines, and more particularly to a machine that is used to propel automotive vehicles, trains and other man and freight carrying vehicles from place to place as well as to provide power for the activation of any desired mechanism.

While machines of every description are being produced to operate with greater and greater efficiency, the horespower required to operate the machines has also been increased to the point where in the final analysis the actual overall efficiency of the machine is far from that which it should be when one considers the ever increasing strides man has made and is still making in the machine building art.

It is therefore the principal object of this invention to provide a revolving machine that will permit the obtaining of more horsepower with less energy being supplied to produce the power.

Another object of this invention is to provide a revolving machine that does not have any dead center.

Another object of this invention is to provide a revolving machine that has fewer moving parts than any power-producing machine now on the market.

Another object of this invention is to provide a revolving machine which can be manufactured in any desired size.

Still another object of this invention is to provide a revolving machine that does not contain any spark plugs, carburetors or other complicated mechanisms that require adjustment.

Other objects, features and advantages of the present invention will become apparent from the following detailed description taken in conjunction with the accompanying drawings, in which:

FIGURE 1 is a side view of this invention.

FIGURE 4 is a sectional view of this invention taken substantially along line 4—4 of FIGURE 1 and viewed in the direction indicated by the arrows.

FIGURE 5 is a sectional view of this invention taken substantially along line 5—5 of FIGURE 1 and viewed in the direction indicated by the arrows.

Figure 2:
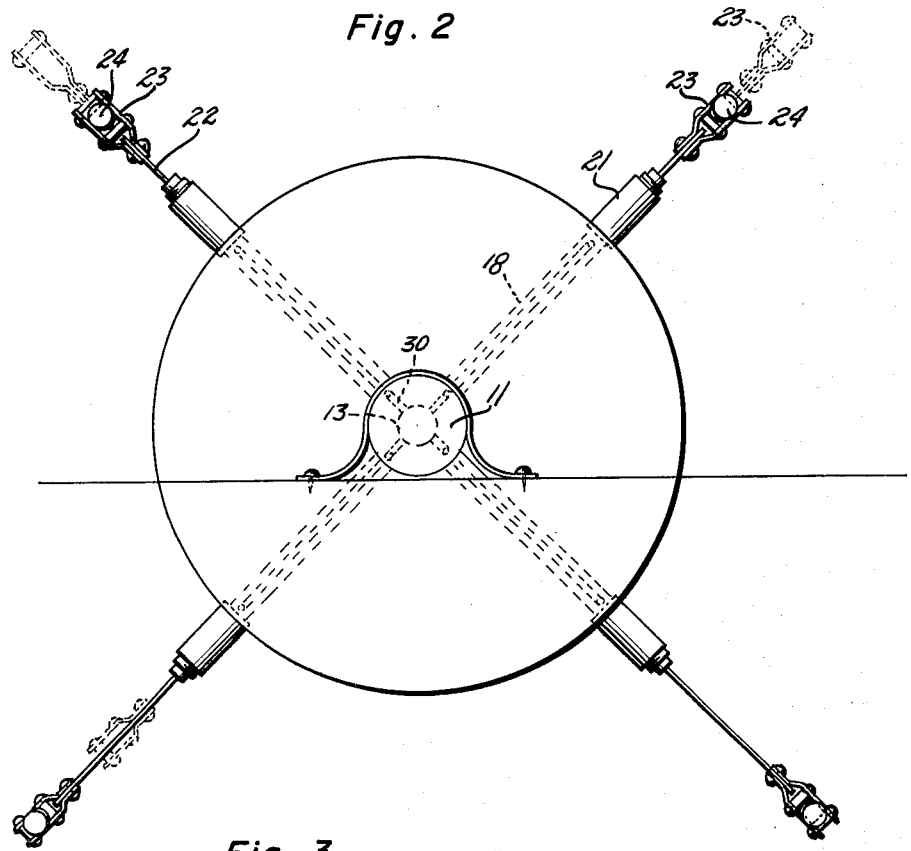
FIGURE 2 is a front view of this invention rotated forty-five degrees for ease of mounting. Some of the details are left out in the view for reasons of clarity.
Figure 3:
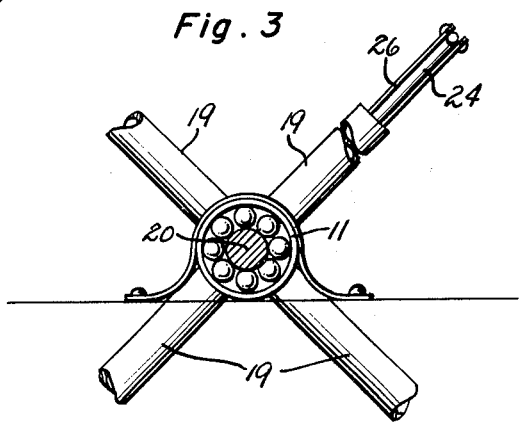
FIGURE 3 is a sectional view of this invention taken substantially along line 3—3 of FIGURE 1 and viewed in the direction indicated by the arrows.

In the drawings, 10 represents hollow pipe rotatably supported at each end by a ball-bearing 11. A plurality of air lines 12 and 8 extend into one end 13 of the aforesaid pipe 10. An end of each air line 12 and 8 connects to the revolving disk 14 having a receiving port 17 or 34 therein for each one of the aforesaid air lines 12 or 8. The just mentioned disk 14 is flush up against the stationary disk 16 having openings 15 and 33 therein for each pair of the aforesaid receiving ports 17 and 34. A plurality of equally spaced cylinders 18 are radially located around one end of the aforesaid hollow pipe 10 while an alike number of tubes 19 are likewise spaced around the other end 20 of the same hollow pipe 10.

Each cylinder 18 has a packing box 21 on the outermost end thereof through which slidably extends the piston rod 22 that has its inner end connected to a piston that is located within the cylinder. Each piston rod 22 has its outer end secured to the link coupling 23 that in turn is connected to one end of the lever 24 that is swingably supported by the outermost end of the pedestal 25 that has its other end fixed to the aforesaid hollow pipe 10. A link 26 connects the aforesaid lever 24 to the thrust crank 27 that has its other end suitably secured to one end of the drive weight 28 that is encased within the aforesaid tube 19. Each thrust crank 27 is swingably supported by the short pedestal 29 which radiates outward from the often mentioned hollow pipe 10 as one can see on looking at FIGURE 1 of the drawings. One air line 30 or 35 carries pressurized air to one side of a motor piston in a cylinder 18, while the other air line 30 or 35 connects to the other side of said motor piston to exhaust air from that side of said piston. A pulley 31 that is secured to the front end of the aforesaid hollow pipe 10 provides a means of transmitting the rotating power of this invention to any other desired machine by means of the belt 32 placed on the aforesaid pulley 31.

The way in which this novel rotating machine works is quite simple to understand by even the most inexperienced person in the mechanical arts. The machine is secured to any desired source of air supply by bolting or otherwise attaching the stationary disk 16 to the structure of the air supply container. Air is admitted to the rotating machine through the openings 15 in the stationary disk 16 that are in turn in line with receiving ports 17 on the top and 34 on the bottom of revolving disk 14. Pressurized air enters the upper port 15 of disk 16 and through port 17 of disk 14 to line 12 which runs into end 13 of pipe 10 and is brought through the wall of pipe 10 as line 35 which will raise the piston in tube 18 and therefore piston rod 22 and through the linkages and levers aforementioned with the final result weight 28 will be raised giving maximum thrust to rotation. At the same time that the above is happening the air through the lower port 15 of disk 16 goes through port 34 of disk 14 and into line 8 which runs into the end 13 of pipe 10 and is brought through the wall of pipe 10 as line 30. This will raise the piston in the lower arm raising the weight 28 in the lower tube 19 thus reducing the load to upper arm thrust, thereby giving the machine more horsepower with less energy as stated in the principal object of this invention of a revolving machine.

To clarify the description refer to the aligned cylinders just referred to as the first aligned cylinders and to the other set of aligned cylinders as the second aligned cylinders. Under the conditions just described, with the upper weight of the first aligned cylinders thrust upward which is radially outward and the lower weight also thrust upward which is radially inward, the second aligned cylinders will be horizontal. If we assume that we are looking at the machine from the direction of FIGURE 2 and that the rotation is clockwise, the weight of the cylinder which extends to the right will be radially outward and the other weight of the second aligned cylinders will be thrust radially inward. Hence the weight at the top and the weight at the right assist each other during the first ninety degrees of rotation.

At the end of this ninety degrees of rotation, the second aligned cylinders are vertical, openings 15 and 33 are aligned with corresponding ports 17 and 34 and the weight which is now uppermost is thrust radially outward while the weight that is now lowermost is thrust radially inward. Of course, the weights remain in the positions to which they are moved until the cylinders, pistons, etc. move them to the other extreme position.

In view of the above it is clear that one set of weights shifts every ninety degrees of rotation and that two weights are always assisting each other.

This invention depends upon the application of pressurized fluid to actuating assemblies to move weights 28 to produce rotation. In FIGURE 1, the upper weight 28 has been thrust radially outward and the lower weight has been thrust radially inward, one with a long moment arm and the other with a short moment arm, which will tend to rotate tubes 19 through substantially 180 degrees. With four segments working there will be a power stroke every 90 degrees of rotation with each stroke lasting approximately 180 degrees, thus giving two power strokes in progress at all times.

The ports 15 and 33 and their relation to ports 17 and 34 must be arranged so that diametrically opposite weights 28 are shifted in position each time the corresponding tubes 19 are vertical or slightly past vertical.

Power is, of course, transmitted from this novel revolving machine by means of the pulley and belt that is on the front end of the invention.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A revolving machine of the character described, comprising a hollow pipe having a plurality of equally spaced and radially extending cylinders projected outward from one end thereof, and a like number of equally spaced and radially extending tubes projected outward from the other end of the said hollow pipe, and a piston in each said cylinder and a weight in each said tube, and mechanism connecting each said piston to its opposite said weight, and a pair of air lines feeding each said cylinder a supply of air from any desired source, and means of transmitting the power generated by the said revolving machine as it rotates to any other desired machine.

2. A revolving machine of the character described, comprising a hollow pipe having a plurality of equally spaced and radially extending cylinders projected outward from one end thereof, and a like number of equally spaced and radially extending tubes projected outward from the other end of the said hollow pipe, and a piston in each said cylinder and a weight in each said tube, and mechanism comprising a piston rod to the upper end of which is connected a link coupling that in turn is connected to a lever to the other end of which is secured a link that activates a thrust crank which has one end connected to the said weight thereby connecting each said piston to its opposite said weight, and a pair of air lines feeding each said cylinder a supply of air from any desired source, and means of transmitting the power generated by the said revolving machine as it rotates to any other desired machine.

3. A revolving machine of the character described, comprising a hollow pipe having a plurality of equally spaced and radially extending cylinders projected outward from one end thereof, and a disk having two receiving ports for each cylinder being secured to the end of the said hollow pipe that is nearest to the said cylinders, and a like number of equally spaced and radially extending tubes projected outward from the other end of the said hollow pipe, and a piston in each said cylinder and a weight in each said tube, and mechanism comprising a piston rod to the upper end of which is connected a link coupling that in turn is connected to a lever to the other end of which is secured a link that activates a thrust crank which has one end connected to the said weight thereby connecting each said piston to its opposite said weight, and a pair of air lines feeding each said cylinder a supply of air from any desired source, and means of transmitting the power generated by the said revolving machine as it rotates to any other desired machine.

4. A revolving machine of the character described, comprising a hollow pipe having a plurality of equally spaced and radially extending cylinders projected outward from one end thereof, and a disk having two receiving ports for each cylinder being secured to that end of the said hollow pipe that is nearest to the said cylinders and a like number of equally spaced and radially extending tubes projected outward from the other end of the said hollow pipe, and a piston in each said cylinder and a weight in each said tube, and mechanism comprising a piston rod to the upper end of which is connected a link coupling that in turn is connected to a lever to the other end of which is secured a link that activates a thrust crank which has one end connected to the said weight thereby connecting each said piston to its opposite said weight, and a pair of air lines feeding each said cylinder a supply of air from any desired source through a stationary disk having the same number of openings therein as there are receiving ports in the first mentioned disk which it, the said stationary disk is flush up against at all times, and means of transmitting the power generated by the said revolving machine as it rotates to any other desired machine.

5. A revolving machine of the character described, comprising a hollow pipe having a plurality of equally spaced and radially extending cylinders projected outward from one end thereof, and a disk having two receiving ports for each cylinder being secured to that end of the said hollow pipe that is nearest to the said cylinders and a like number of equally spaced and radially extending tubes projected outward from the other end of the said hollow pipe, and a piston in each said cylinder and a weight in each said tube, and mechanism comprising a piston rod to the upper end of whcich is connected a link coupling that in turn is connected to a lever to the other end of which is secured a link that activates a thrust crank which has one end connected to the said weight thereby connecting each said piston to its opposite said weight, and a pair of air lines feeding each said cylinder a supply of air from any desired source through a stationary disk having the same number of openings therein as there are receiving ports in the first mentioned disk which it, the said stationary disk is flush up against at all times, and a pulley secured to the front end of the said hollow pipe, and a belt on the said pulley thereby providing a means of transmitting the power generated by the said revolving machine as it rotates to any other desired machine.

References Cited by the Examiner

UNITED STATES PATENTS

| 578,062 | 3/1897 | Lightner | 60—10 |
| 606,304 | 6/1898 | Schlachter | 60—57 |
| 2,989,839 | 6/1961 | Croy | 60—10 |

FOREIGN PATENTS 36,157  2/1909  Austria.

EDGAR W. GEOGHEGAN, *Primary Examiner.*